US011453455B2

(12) United States Patent
Hirano et al.

(10) Patent No.: US 11,453,455 B2
(45) Date of Patent: Sep. 27, 2022

(54) OIL FILLER CAP AND SADDLE RIDING TYPE VEHICLE

(71) Applicant: HONDA MOTOR CO., LTD., Tokyo (JP)

(72) Inventors: Kohei Hirano, Wako (JP); Yusaburo Tani, Wako (JP); Hiroshi Nakashima, Wako (JP); Yoshihito Tokuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 859 days.

(21) Appl. No.: 16/051,733

(22) Filed: Aug. 1, 2018

(65) Prior Publication Data
US 2019/0039673 A1    Feb. 7, 2019

(30) Foreign Application Priority Data
Aug. 3, 2017   (JP) .............................. JP2017-150837

(51) Int. Cl.
*B60K 15/04* (2006.01)
*B62J 37/00* (2006.01)
(Continued)

(52) U.S. Cl.
CPC ............... *B62J 37/00* (2013.01); *B60K 15/03* (2013.01); *B60K 15/0406* (2013.01); *B62J 35/00* (2013.01); *F02M 25/089* (2013.01); *F02M 37/0076* (2013.01); *B60K 2015/03296* (2013.01); *B60K 2015/03547* (2013.01); *B60Y 2200/12* (2013.01)

(58) Field of Classification Search
CPC ............... B60K 15/0406; B60K 15/03; B60K 2015/03547; B62J 37/00; B62J 35/00; B62J 99/00; F02M 25/089; F02M 37/0076
See application file for complete search history.

(56) References Cited

U.S. PATENT DOCUMENTS 4,795,053 A * 1/1989 Kasugai ............. B60K 15/0406
220/203.2
5,110,003 A * 5/1992 MacWilliams .... B60K 15/0406
220/288
(Continued)

FOREIGN PATENT DOCUMENTS

CA    1275940    11/1990
CA    2924948    4/2015
(Continued)

OTHER PUBLICATIONS

Japanese Office Action for Japanese Patent Application No. 2017-150837 dated Feb. 26, 2019.
(Continued)

*Primary Examiner* — Gonzalo Laguarda
(74) *Attorney, Agent, or Firm* — Amin, Turocy & Watson, LLP (57) ABSTRACT

In an oil filler cap, a valve part of a valve device is arranged in a range between a lower end of a screw part that is screwed to an oil filler opening part in a cap body and a seal surface that is arranged at a higher position than the screw part, a ventilation passage part is arranged above the valve part, and a ratchet mechanism is arranged on an outer circumferential side of the ventilation passage part.

5 Claims, 5 Drawing Sheets

(51) Int. Cl.
  *B62J 35/00*   (2006.01)
  *F02M 25/08*   (2006.01)
  *F02M 37/00*   (2006.01)
  *B60K 15/03*   (2006.01)
  *B60K 15/035*  (2006.01)

(56) References Cited

U.S. PATENT DOCUMENTS

| | | | | |
|---|---|---|---|---|
| 6,352,243 | B1* | 3/2002 | Samejima | B66D 1/58 |
| | | | | 254/346 |
| 7,677,277 | B2* | 3/2010 | Thompson | B60K 15/0406 |
| | | | | 141/350 |
| 7,971,606 | B2* | 7/2011 | Cho | H01M 8/04208 |
| | | | | 251/149.6 |
| 8,561,826 | B2* | 10/2013 | Wang | B01D 53/0407 |
| | | | | 220/373 |
| 8,973,948 | B2* | 3/2015 | Kanai | B62J 35/00 |
| | | | | 280/835 |
| 2019/0381880 | A1* | 12/2019 | Kamiyama | F02M 25/089 |

FOREIGN PATENT DOCUMENTS

| | | |
|---|---|---|
| CA | 2971376 | 8/2016 |
| JP | 54-147313 | 10/1979 |
| JP | 59-175049 | 11/1984 |
| JP | 59-179792 | 12/1984 |
| JP | 03-040977 | 4/1991 |
| JP | 06-040462 | 2/1994 |
| JP | 2005-047334 | 2/2005 |
| JP | 2008-007095 | 1/2008 |

OTHER PUBLICATIONS

Canadian Office Action for Canadian Patent Application No. 3,013,006 dated Jul. 26, 2019.

Japanese Office Action for Japanese Patent Application No. 2017-150837 dated Sep. 24, 2019.

* cited by examiner

OIL FILLER CAP AND SADDLE RIDING TYPE VEHICLE

CROSS-REFERENCE TO RELATED APPLICATION

Priority is claimed on Japanese Patent Application No. 2017-150837, filed on Aug. 3, 2017, the contents of which are incorporated herein by reference.

BACKGROUND

Field of the Invention

The present invention relates to an oil filler cap and a saddle riding type vehicle.

Background

Japanese Unexamined Utility Model Application, First Publication No. H3-40977 discloses a structure in which an air hole that allows the inside and the outside of a fuel tank to communicate with each other is formed on a cap that closes an oil filler opening of the fuel tank, a float is provided inside the fuel tank, and a valve that closes the air hole at an elevated position of the float is provided on the float.

The air hole of the fuel cap prevents the inside of the fuel tank from becoming a negative pressure or becoming a high pressure and prevents a fuel from leaking out from the air hole when the fuel tank is slanted.

SUMMARY

In a screw-in oil filler cap for the oil filler opening, the fuel leak prevention from the oil filler opening is premised on the oil filler cap being moderately tightened. Therefore, the screw-in oil filler cap may include a ratchet mechanism for monitoring a tightening torque. However, when the ratchet mechanism and the float valve and the like are combined, there is a problem that the size of the oil filler cap may be increased.

An object of an aspect of the present invention is to provide an oil filler cap capable of preventing a size increase while including a ratchet mechanism that monitors a tightening torque and a valve device used for fuel leak prevention and a saddle riding type vehicle that includes the oil filler cap.

(1) An aspect of the present invention provides an oil filler cap which includes: a cap body that is screwed to an oil filler opening part of a fuel tank and that closes an oil filler opening; a ventilation passage part that penetrates through the cap body and that allows an inside and an outside of the fuel tank to communicate with each other; a valve device that operates a float in accordance with a fuel fluid-level position and that opens and closes an opening which communicates with the ventilation passage part; a grip part that is provided to be relatively rotatable around a screw axis with respect to the cap body; and a ratchet mechanism that is formed between the grip part and the cap body and that monitors a tightening torque of the cap body, wherein a valve part of the valve device is arranged between a lower end of a screw part that is screwed to the oil filler opening part in the cap body and a seal surface that is arranged at a higher position than the screw part, the ventilation passage part is arranged above the valve part, and the ratchet mechanism is arranged on an outer circumferential side of the ventilation passage part.

(2) In the oil filler cap described above, the ventilation passage part may penetrate through the cap body along the screw axis and may be supported relatively rotatably via a seal member by a penetration part of the cap body.

(3) Another aspect of the present invention provides a saddle riding type vehicle that includes the oil filler cap described above, wherein the ventilation passage part is connected via a piping to an evaporated fuel reservoir that is supported on a vehicle body side.

(4) In the saddle riding type vehicle described above, the oil filler cap may be arranged at an upper part and a middle part in a right-to-left direction of the fuel tank.

(5) In the saddle riding type vehicle described above, the fuel tank may have an expansion shape part of which a horizontal cross-sectional area is decreased toward the oil filler opening part around the oil filler opening part.

According to the configuration (1) described above, since the valve part of the valve device is arranged between the lower end of the screw part and the seal surface at an upper position of the screw part, a protrusion amount in a downward direction of the valve device is reduced, and it is possible to prevent a size increase in a height direction of the oil filler cap.

Further, since the ratchet mechanism that monitors a tightening torque is provided between the grip part and the cap body, it becomes possible to keep a tightening margin of the screw part of the oil filler cap constant, and it is possible to facilitate attachment and detachment of the oil filler cap and also realize secure closure of the oil filler opening.

Further, since the ratchet mechanism is arranged on the outer circumferential side of the ventilation passage part that continues to the upper portion of the valve part, it is possible to prevent the size increase in the height direction of the oil filler cap while obtaining a merit according to the ratchet mechanism being provided.

According to the configuration (2) described above, since the ventilation passage part that penetrates through the cap body along the screw axis is supported relatively rotatably via the seal member by the cap body, even in a configuration in which the piping is connected to the ventilation passage part, the ventilation passage part is rotated when performing a tightening operation of the oil filler cap, and the piping is not rotated. Therefore, it is possible to improve workability.

According to the configuration (3) described above, even in a configuration in which the ventilation passage part is connected via the piping to the evaporated fuel reservoir on the vehicle body side, since the ventilation passage is rotatable, distortion or the like of the piping is prevented, and it is possible to favorably maintain the durability and the arrangement state of the piping and to favorably perform the tightening operation of the oil filler cap.

According to the configuration (4) described above, since the valve device is positioned at an upper part of the fuel tank, it is possible to arrange the float above the fuel fluid level and open the ventilation passage part at an ordinary time when the inclination of the fuel fluid level is small and to allow the float to react to the inclination of the fuel fluid level and close the ventilation passage part with a good sensitivity at the time of vehicle body inclination and the like. Further, the valve device is positioned at the middle part in the right-to-left direction of the fuel tank, and therefore, it is possible to allow the float to react equally even at the time of vehicle body inclination to any of right and left directions.

According to the configuration (5) described above, by narrowing a tank inner space directly below the oil filler opening part, the change of the fuel fluid level at the time of vehicle body inclination and the like is increased, and it is possible to enhance the reaction sensitivity of the float.

DESCRIPTION OF THE EMBODIMENTS

Hereinafter, an embodiment of the present invention will be described with reference to the drawings. In the following description, unless otherwise stated, front, rear, right, and left directions and the like are the same as directions in a vehicle to be described below. Moreover, in suitable places in the drawings used for the following description, an arrow FR that indicates a frontward direction of the vehicle, an arrow LH that indicates a leftward direction of the vehicle, and an arrow UP that indicates an upward direction of the vehicle are shown.

Figure 1:
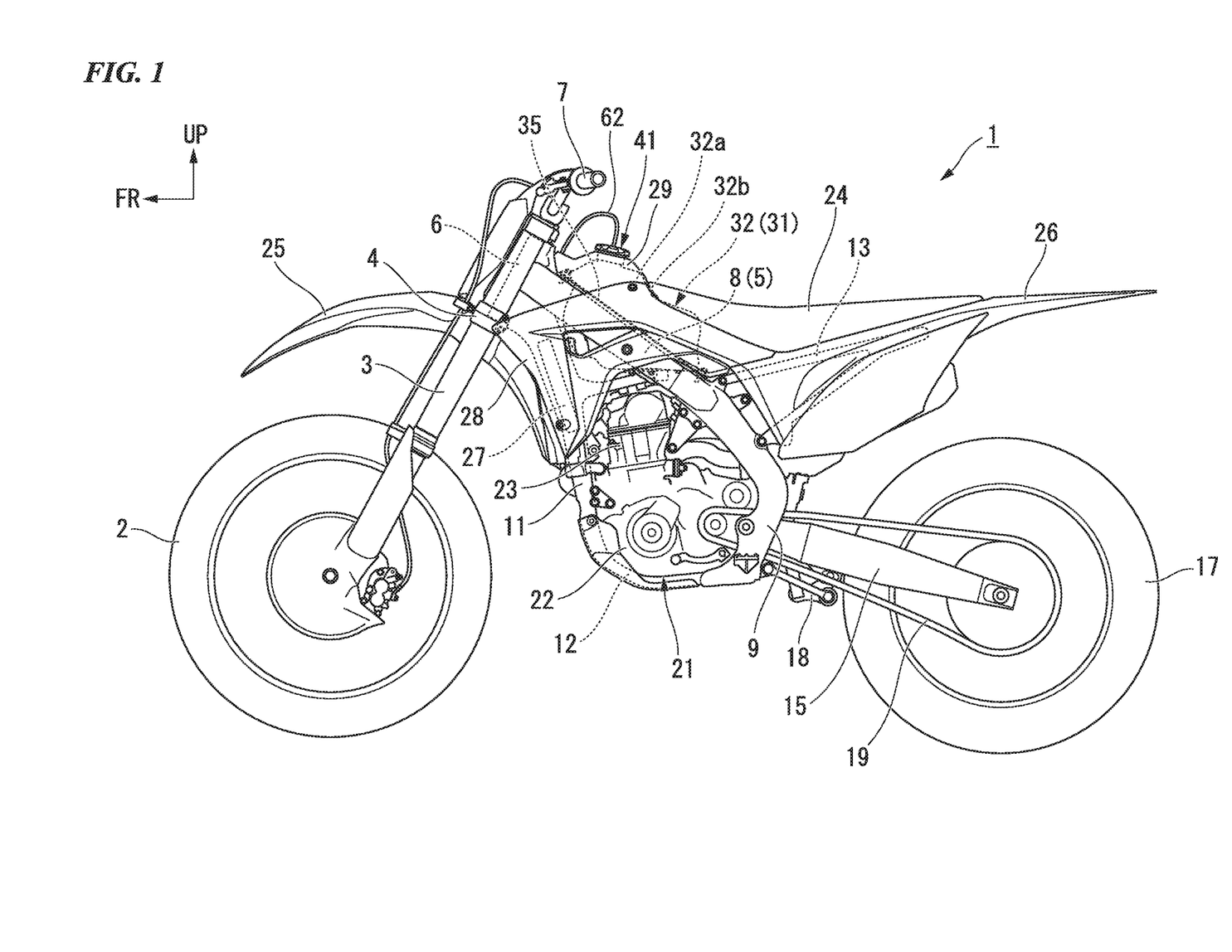
FIG. 1 is a left side view of a motorcycle in an embodiment of the present invention.

In an off-road-type motorcycle (saddle riding type vehicle) 1 shown in FIG. 1, a front wheel 2 of the motorcycle 1 is pivotally supported by a lower end part of right and left front forks 3. Upper parts of the right and left front forks 3 are steerably and pivotably supported by a head pipe 6 of a vehicle body frame 5 via a steering stem 4. A bar-type steering handle 7 is attached to an upper part of the steering stem 4.

Right and left main tubes 8 extend rearward from an upper rear part of the head pipe 6 such that a more rearward part is positioned more downward. A rear end part of the right main tube 8 continues to an upper end part of a right pivot frame 9 at a middle part in a front-to-rear direction of the vehicle body. A rear end part of the left main tube 8 continues to an upper end part of a left pivot frame 9 at a middle part in a front-to-rear direction of the vehicle body. A single downward frame 11 that defines a steeper slope than the right and left main tubes 8 extends diagonally rearward and downward from a lower rear part of the head pipe 6. Right and left lower frames 12 that defines a slope similar to the downward frame 11 extend from a lower end part of the downward frame 11 so as to branch to right and left directions. A lower part of the right lower frame 12 is curved rearward and is connected to a lower end part of the right pivot frame 9. A lower part of the left lower frame 12 is curved rearward and is connected to a lower end part of the left pivot frame 9.

The vehicle body frame 5 constitutes a twin-spar-type cradle frame. An engine 21 which is a motor of the motorcycle 1 is provided inside the vehicle body frame 5. A seat frame 13 is connected to rear parts of the main tube 8 and the pivot frame 9. The term "middle" used in the present embodiment includes not only a center between both ends of a target but also an inner range between both ends of a target.

A front end part (base end part) of a swing arm 15 is pivotably supported swingably upward and downward by lower parts of the right and left pivot frames 9. A rear wheel 17 of the motorcycle 1 is pivotally supported by a rear end part of the swing arm 15. A lower end part of a rear cushion (not shown is connected via a link mechanism 18 to a front lower part of the awing arm 15. An upper end part of the rear cushion is connected to a cross member (not shown) that bridges a space between vicinities of rear end parts of the right and left main tubes 8.

The engine 21 is a single cylinder engine having a crank shaft that is parallel to a vehicle width direction (right-to-left direction). A cylinder 23 is provided to stand substantially vertically above a front part of a crankcase 22 that constitutes a lower part of the engine 21.

A throttle body 66 of an engine intake system (not shown) is connected to a rear part of the cylinder 23. An exhaust pipe of an engine exhaust system (not shown) is connected to a front part of the cylinder 23.

A rear part of the crankcase 22 is also a transmission case that accommodates a clutch and a transmission. An output shaft of the transmission protrudes at a left rear part of the crankcase 22. The output shaft of the transmission and the rear wheel 17 are connected to each other via a chain-type power transmission mechanism 19.

A fuel tank 31 is provided between the right and left main tubes 8 above the cylinder 23. A seat 24 is provided on the seat frame 13 at a rearward part of the right and left main tubes 8. A frontward part of the seat 24 extends frontward and is supported by an upper surface of a rear part of the fuel tank 31.

A front fender 25 is supported by a bottom bridge of the steering stem 4. A rear fender 26 extends toward a rearward direction of the seat 24. Each of right and left radiators 27 is arranged at each of both side directions of the downward frame 11. A right shroud 28 shrouds a range from a side surface of the fuel tank 31 to a front side surface of the right radiator 27. A left shroud 28 shrouds a range from a side surface of the fuel tank 31 to a front side surface of the left radiator 27.

Next, the fuel tank 31 is described.

An upper half part of the fuel tank 31 is arranged at a higher position than an upper surface of the right and left main tubes 8. An oil filler cap 41 in use for opening and closing an oil filler opening is provided on a front upper end part of the fuel tank 31.

Figure 3:
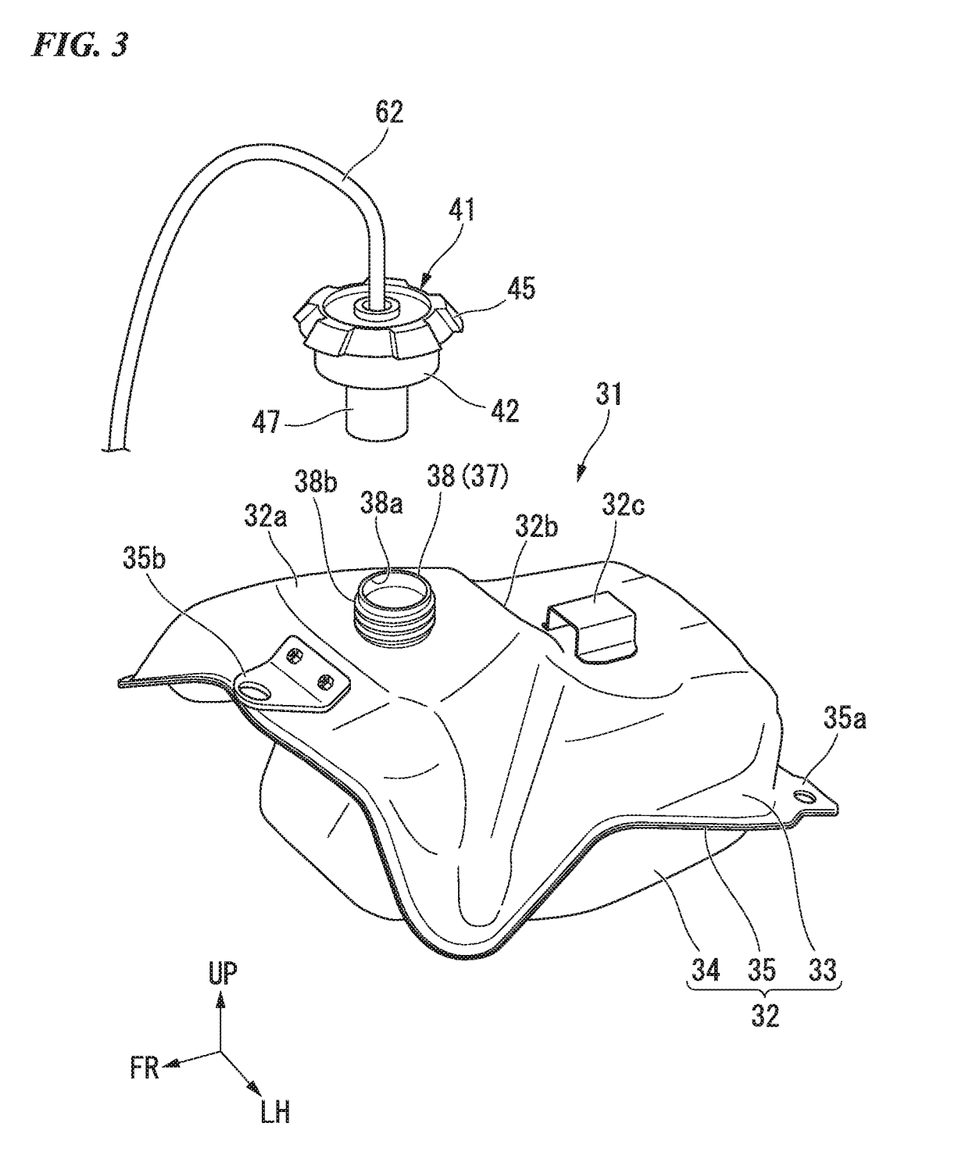
FIG. 3 is a perspective view of the fuel tank.

With reference also to FIG. 3, the fuel tank 31 has a tank main body 32, for example, made of a pure titanium. An upper half body 33 that forms an upper part of the tank main body 32 and a lower half body 34 that forms a lower part of the tank main body 32 are joined to each other, and thereby, the tank main body 32 has an integrated hollow structure. A division surface of the upper half body 33 and the lower half body 34 in the tank main body 32 is sloped along an upper surface of the main tube 8 such that a more rearward part is positioned more downward. A joint flange 35 of the upper half body 33 and the lower half body 34 is provided along the division surface of the upper half body 33 and the lower half body 34 such that a more rearward part is positioned more downward.

A mount part 35a for rubber mounting of a rear part of the fuel tank 31 to the vehicle body frame 5 is provided on both sides at a rear part of the joint flange 35. A mount bracket 35b for rubber mounting of a front part of the fuel tank 31 to the vehicle body frame 5 is fastened to a front part of the upper half body 33.

In the fuel tank 31, in a state of being mounted on the frame, the upper half body 33 at a higher position than the joint flange 35 is arranged at a higher position than an upper surface of the main tube 8.

Figure 2:
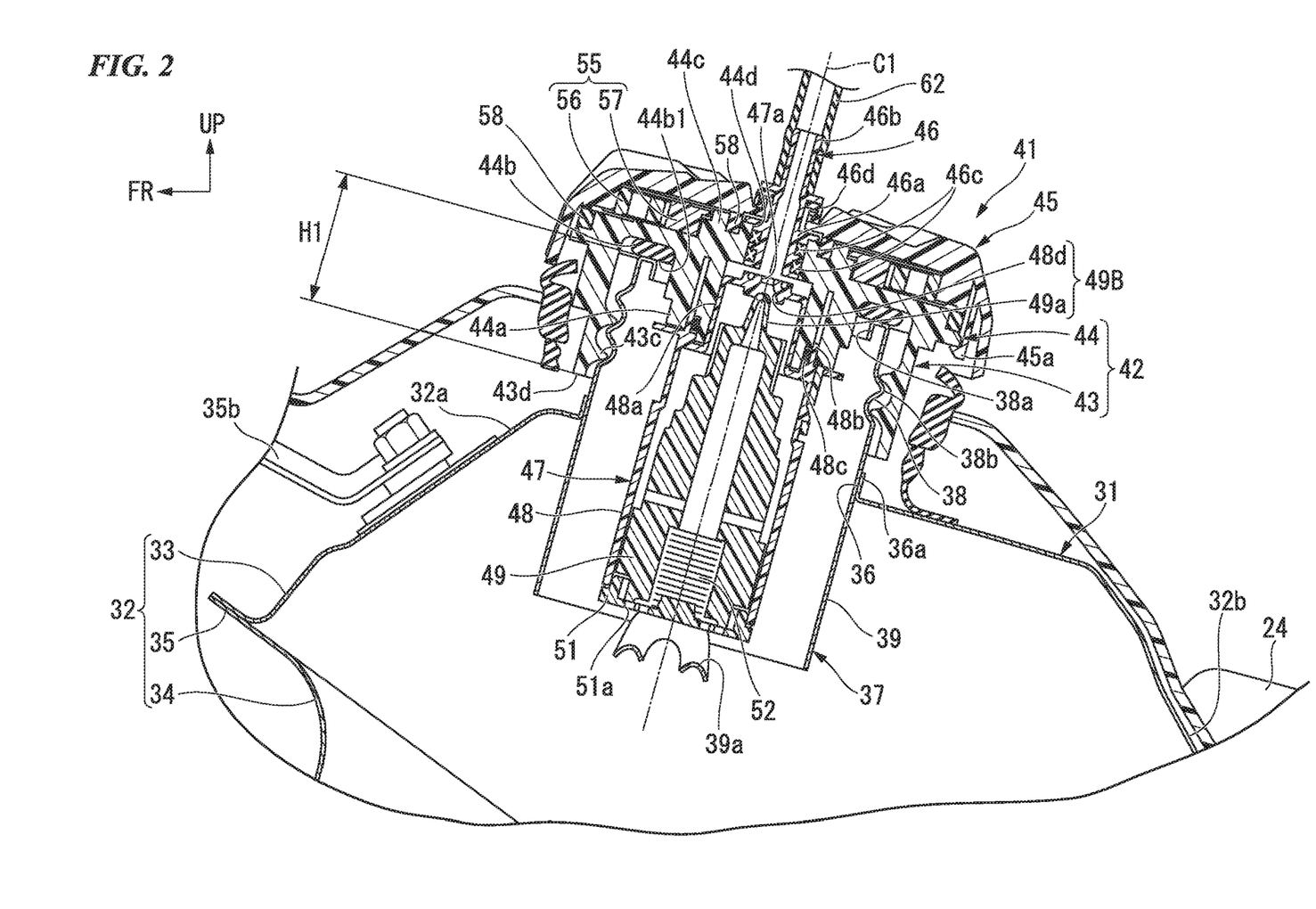
FIG. 2 is a cross-sectional view along a center plane in a right-to-left direction in the vicinity of an oil filler opening of a fuel tank of the motorcycle.

With reference also to FIG. 2, a circular insertion hole 36 that opens upward is formed on an upper end part and a middle part in the right-to-left direction of the upper half body 33. An oil filler opening tube body 37 (oil filler opening part) is joined to the insertion hole 36. The oil filler opening tube body 37 defines a cylinder shape. The oil filler opening tube body 37 integrally has a cap mount part 38 that protrudes in an upward direction of the tank main body 32 and a downward extension part 39 that faces toward an inward direction of the tank main body 32. An upper end opening of the oil filler opening tube body 37 constitutes an oil filler opening 38a. A nozzle regulation member 39a that regulates an insertion amount of an oil filler nozzle is provided on a lower end opening of the oil filler opening tube body 37.

For example, a screw thread 38b that screws the oil filler cap 41 to an outer circumference of the cap mount part 38 is formed on the cap mount part 38. The downward extension part 39 defines a cylinder shape having a flat outer circumferential surface. The downward extension part 39 is inserted to the inside of the tank via the insertion hole 36. The oil filler opening tube body 37 is joined to a circumferential edge flange 36a of the insertion hole 36 by seam welding and the like.

For example, a front upper part (around the oil filler opening tube body 37) of the fuel tank 31 is covered by a top shelter 29 made of resin. Right and left side parts of the fuel tank 31 are covered by a rear part of the shroud 28 made of resin.

An expansion shape part 32a that defines an expansion shape directed in an upward direction is provided on a front upper part (around the oil filler opening tube part) of the upper half body 33 of the fuel tank 31. The expansion shape part 32a is formed such that a horizontal cross-sectional area is decreased at a higher part toward the oil filler opening tube part. A seat matching part 32b that is sloped such that a more rearward part is positioned more downward and that allows a front part of the seat 24 to ride on the seat matching part 32b is formed at a rear part of the expansion shape part 32a. A latch stay 32c having a hat shape is attached to an upper surface of the seat matching part 32b by welding and the like. The latch stay 32c opens rearward. A latch claw (not shown) on a lower surface of a front part of the seat 24 is inserted to and latched by the latch stay 32c.

Figure 5:
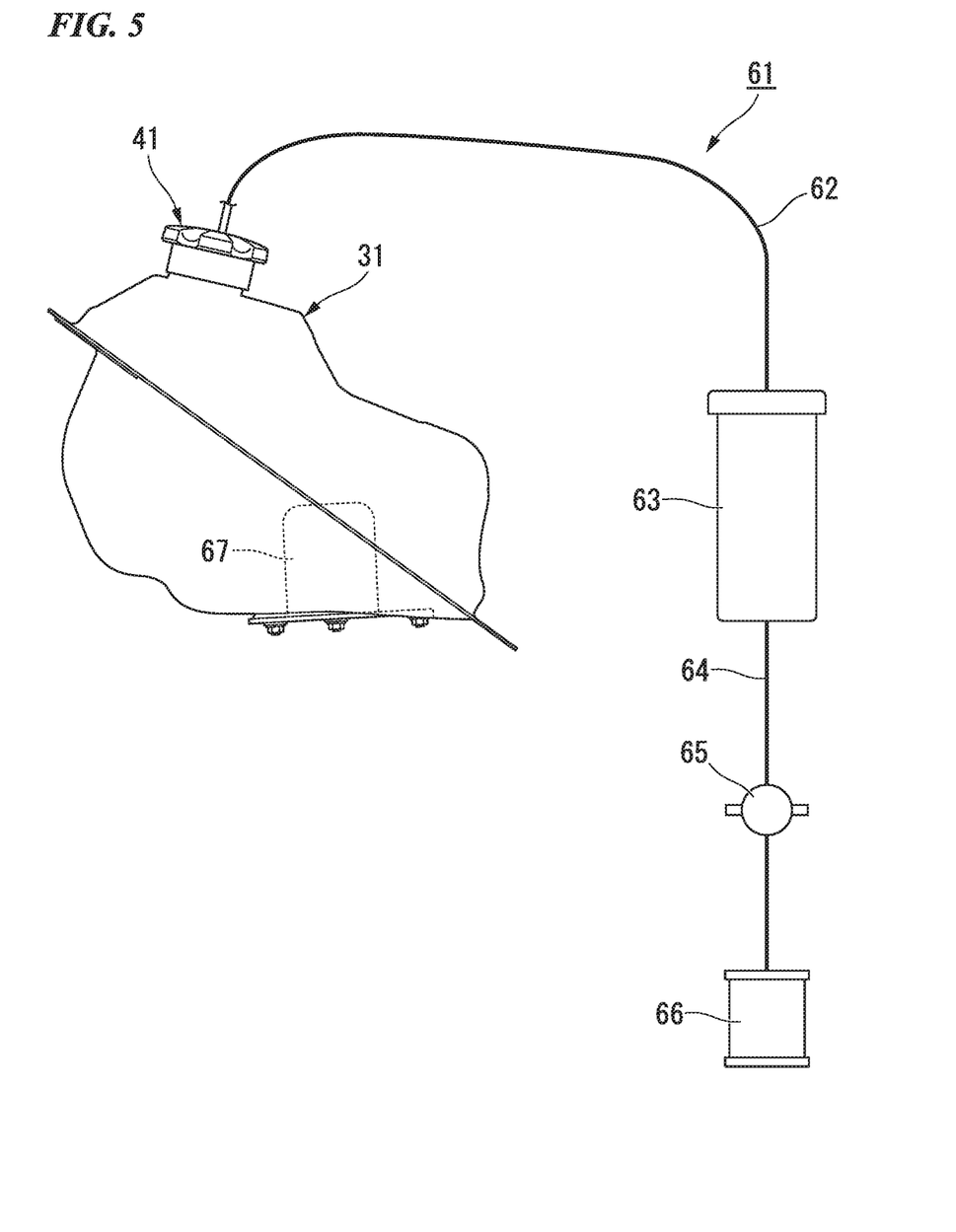
FIG. 5 is a configuration view of an evaporated fuel process apparatus of the motorcycle.

Next, with reference to FIG. 5, an evaporated fuel process apparatus 61 of the motorcycle 1 is described.

The evaporated fuel process apparatus 61 includes the fuel tank 31, a charge piping 62 (piping) that is connected to the oil filler cap 41 of the fuel tank 31, a canister 63 (evaporated fuel reservoir) that is connected to the charge piping 62 at an external part of the fuel tank 31, and a purge piping 64 that allows the canister 63 and the throttle body 66 of the engine intake system to communicate with each other. A purge control valve 65 is provided on the purge piping 64. The purge control valve 65 is opened and closed by the control of an engine control unit. A fuel pump 67 is provided on the fuel tank 31.

The oil filler cap 41 includes a ventilation passage part 46 that allows the inside and the outside of the fuel tank 31 to communicate with each other. The evaporated fuel that is generated at the inside of the fuel tank 31 is introduced to the outside of the fuel tank 31 via the ventilation passage part 46. The canister 63 has an adsorbent such as an activated carbon at the inside of the canister 63. The canister 63 allows the adsorbent to adsorb the evaporated fuel that is sent from the charge piping 62 and stores the evaporate fuel.

Next, with reference to FIG. 2, the oil filler cap 41 is described.

The oil filler cap 41 includes a cap body 42, a grip part 45, the ventilation passage part 46, a valve device 47, and a ratchet mechanism 55.

The cap body 42 is screwed to the oil filler opening tube body 37 and closes the oil filler opening 38a. The cap body 42 defines a cylinder shape that is coaxial with the oil filler opening tube body 37. A screw tube 43 having an inner circumference on which a screw thread that corresponds to the screw thread 38b of the oil filler opening tube body 37 is formed and a disk part 44 that is attached so as to close an upper end opening of the screw tube 43 are integrally formed on the cap body 42. Hereinafter, a region at which the screw thread is formed in the inner circumference of the screw tube 43 may be referred to as a screw part 43c.

By the screw tube 43 being screwed to the outer circumference of the screw thread 38b, the diameter of the screw tube 43 is increased, and the layout property of the ratchet mechanism 55 is made favorable while preventing mud, sand, and the like to adhere to a seal 44b. That is, the diameter of the ratchet mechanism 55 is increased, and it is possible to enhance the degree of freedom of torque setting. Hereinafter, a center axis line C1 of the oil filler opening tube body 37 may be referred to as a screw axis C1.

A lower collar part 44a having a double wall structure is provided to protrude on a lower surface of the disk part 44. An upper part of the valve device 47 is attached to the lower collar part 44a. A packing 44b is attached to a base end (upper end) outer circumference of the lower collar part 44a. The packing 44b is interposed between the lower surface of the disk part 44 and an upper end surface of the oil filler opening tube body 37 when the oil filler cap 41 is attached to the oil filler opening tube body 37. A lower surface of the packing 44b becomes a seal surface 44b1 of the oil filler cap 41. An upper collar part 44c having a smaller diameter and a lower height that the lower collar part 44a is provided to protrude on an upper surface of the disk part 44. The ratchet mechanism 55 described later is arranged on an outer circumference of the upper collar part 44c.

The grip part 45 as a handle for performing a rotation operation of the oil filler cap 41 is attached to the cap body 42. The grip part 45 is provided relatively rotatably around the screw axis C1 with respect to the cap body 42. A latch claw 45a that is rotatably engaged with an outer circumferential part of the cap body 42 is provided on an inner side of an outer circumferential portion of the grip part 45. The ratchet mechanism 55 that allows a tightening torque of a prescribed value or more to escape is provided between the grip part 45 and the cap body 42. A dust seal 58 is provided on the inside and the outside of the arrangement space of the ratchet mechanism 55.

The ventilation passage part 46 defines a cylinder shape that is coaxial with the screw axis C1, penetrates along the screw axis C1 through the cap body 42 and the grip part 45, and allows the inside and the outside of the fuel tank 31 to be communicable with each other.

The ventilation passage part 46 includes a supported part 46a that is supported by the cap body 42 and a nozzle part 46b that is connected to the charge piping 62 (for example, a rubber hose).

The supported part 46a is rotatably supported via a vertically double-deck seal member 46c by a middle penetration part 44d of the disk part 44. The seal member 46c defines a cross-sectional X shape and extends in a circumferential direction centered at the screw axis C1. A seal cap 46d prevents mud, sand, and the like from entering a space between the center opening of the grip part 45 and the ventilation passage part 46.

The nozzle part 46b protrudes above the cap body 42 and the grip part 45 and allows the charge piping 62 to be connectable to the nozzle part 46b. The charge piping 62 is connected to the canister 63 that is supported by the vehicle body.

The valve device 47 allows the float 49 to operate in accordance with a fuel fluid-level position and opens and closes a communication opening 47a (opening) which communicates with the ventilation passage part 46.

The valve device 47 includes a valve case 48, the float 49, a bottom cap 51, and a spring 52.

The valve case 48 defines a cylinder shape centered at the screw axis C1 and has a shrinkage diameter part 48a and a collar part 48b at an upper end part of the valve case 48. By fitting and inserting the shrinkage diameter part 48a to the inside of the lower collar part 44a and inserting the collar part 48b together with an O ring 48c in a gap between double walls of the lower collar part 44a, the valve case 48 is attached to the cap body 42. A latch part for retaining the valve case 48 is shown in the drawing.

The float 49 is accommodated movably vertically inside the valve case 48. The float 49 is provided such that a higher part has a reduced diameter in a step-by-step manner. A shrinking valve body 49a having a taper shape is formed on an upper end part of the float 49.

A communication hole that allows the inside and the outside of the valve case 48 to communicate with each other is formed on an upper end part of the valve case 48, and a valve seat 48d to which the valve body 49a of the float 49 approaches and from which the valve body 49a of the float 49 is separated is formed immediately below the communication hole. The valve body 49a and the valve seat 48d form a valve part 49B of the valve device 47.

The bottom cap 51 closes a lower end opening of the valve case 48. An opening 51a that allows the evaporated fuel and the like to be capable of flowing in the inside of the valve case 48 is formed on the bottom cap 51.

The spring 52 is, for example, a coil spring. The spring 52 is provided to be shrunk between an upper surface at a middle part of the bottom cap 51 and a step surface on an inner side of a lower part of the float 49 and biases the float 49 toward the upward direction. The biasing force of the spring 52 is set to a degree in which the float 49 descends by the own weight of the float 49 in a state where the fuel fluid-level position is low and little buoyancy force acts on the float 49.

On the other hand, the biasing force of the spring 52 is set to a degree in which the float 49 ascends when, in a state where a buoyancy force of a prescribed value or more acts on the float 49, the sum of this buoyancy force and the biasing force of the spring 52 exceeds the own weight of the float 49.

In such a configuration, even when oil is filled to a degree in which a lower end part of the valve device 47 is immersed in the fuel, the buoyancy force that acts on the float 49 is small, and the float 49 descends by the own weight of the float 49 and opens the communication opening 47a. Thereby, the evaporated fuel inside the fuel tank 31 is delivered to the canister 63 through the charge piping 62 from the communication opening 47a.

On the other hand, when most of the valve device 47 is immersed in the fuel due to the slope of the vehicle body and the like, a large buoyancy force acts on the float 49 due to the fuel that enters the inside of the valve case 48. When the sum of this buoyancy force and the biasing force of the spring 52 exceeds the own weight of the float 49, the float 49 ascends and closes the communication opening 47a. That is, the valve device 47 constitutes a rollover valve that closes when the vehicle body slope of the motorcycle 1 becomes a prescribed value or more. Thereby, it is possible to prevent the fuel inside the fuel tank 31 from flowing out from the communication opening 47a to the canister 63 side at the time of rollover of the motorcycle 1 and the like.

Figure 4:
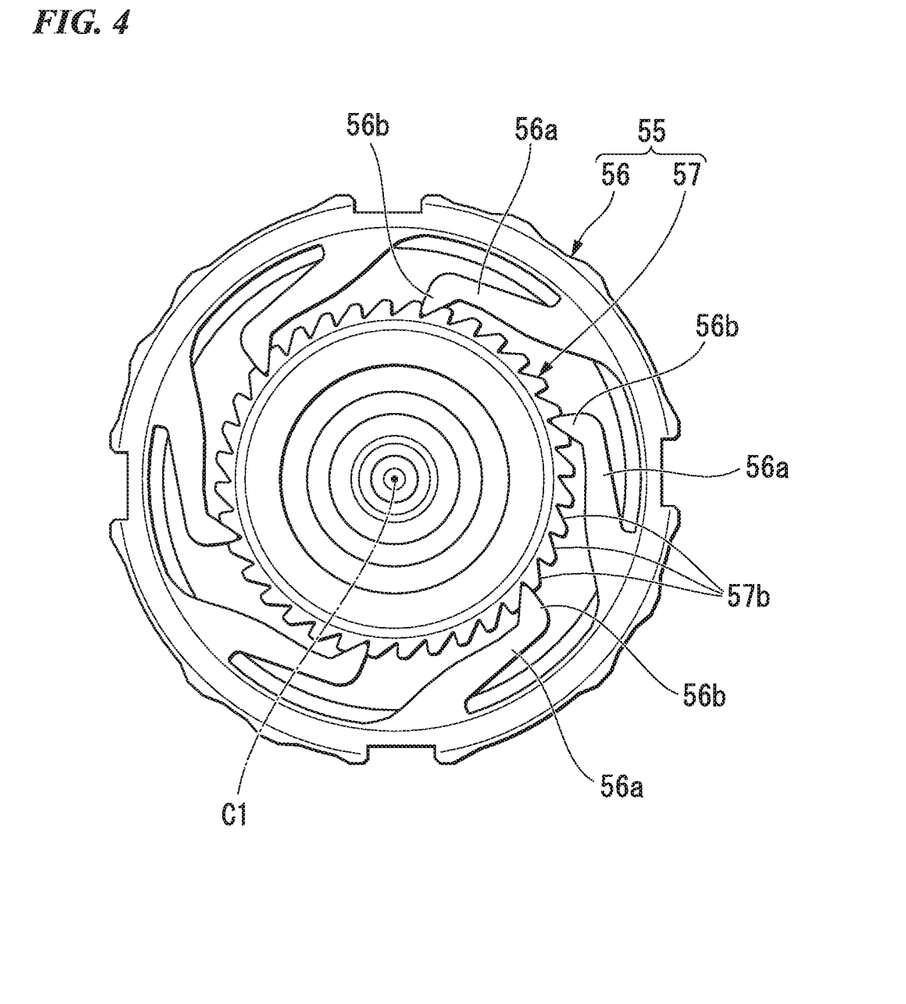
FIG. 4 is a plan view of a ratchet mechanism of an oil filler cap of the fuel tank.

With reference also to FIG. 4, the ratchet mechanism 55 includes an outer ring 56 having a plurality of ratchet claws 56b and an inner ring 57 having a ratchet gear tooth 57b to which the plurality of ratchet claws 56b are fitted.

The outer ring 56 is attached to the inner side of the grip part 45 so as to be integrally rotatable. The inner ring 57 is attached to an upper part of the cap body 42 so as to be integrally rotatable.

The outer ring 56 forms, on the inner circumferential side of the outer ring 56, a plurality of elastic arms 56a that extend to be sloped so as to be positioned in a more counterclockwise direction at a more inner circumferential side when seen from the upper direction of the oil filler cap 41. The ratchet claw 56b that protrudes toward the inner circumferential side is formed on a front end part of each of the elastic arms 56a. Each ratchet claw 56b is engaged with a corresponding region of the ratchet gear tooth 57b of the inner ring 57.

The screw of the oil filler cap 41 is a so-called plus screw. The screw of the oil filler cap 41 is tightened by a counterclockwise rotation and is loosened by a clockwise rotation. When the oil filler cap 41 is tightened, the ratchet claw 56b of the plurality of elastic arms 56a is engaged with the ratchet gear tooth 57b, and thereby, the grip part 45 and the cap body 42 are integrally rotated. Therefore, by gripping the grip part 45 and rotating the grip part 45 in the counterclockwise direction, it is possible to tighten the oil filler cap 41.

When the oil filler cap 41 is tightened, the packing 44b is compressed, and the oil filler opening 38a is sealed. When the grip part 45 is further rotated in the counterclockwise direction from this point, the rotation of the cap body 42 is prevented by an elastic reaction force of the packing 44b and the like, and a relative torque between the cap body 42 and the grip part 45 works. When the relative torque becomes a prescribed value or more, the ratchet mechanism 55 elastically deforms each elastic arm 56a and changes the engagement position of each ratchet claw 56b with respect to the ratchet gear tooth 57b. Thereby, the grip part 45 is relatively rotated with respect to the cap body 42, and the tightening torque is allowed to escape. When the tightened oil filler cap 41 is loosened, the ratchet mechanism 55 is capable of transmitting the torque without elastically deforming each elastic arm 56a even if the relative torque between the cap body 42 and the grip part 45 works.

In the oil filler cap 41 in the present embodiment, the valve part 49B of the valve device 47 is arranged in a vertical range H1 between a lower end 43d (which is also a lower end of the screw tube 43) of the screw part 43c that is screwed to the oil filler opening tube body 37 in the cap body 42 and the seal surface 44b1 of the packing 44b that is arranged at a higher position than the screw part 43c, the ventilation passage part 46 is arranged above the valve part 49B, and the ratchet mechanism 55 is arranged on the outer circumferential side of the ventilation passage part 46.

According to this configuration, since the valve part 49B of the valve device 47 is arranged between the lower end 43d of the screw part 43c and the seal surface 44b1 at the upper position of the screw part 43c, a protrusion amount in the downward direction of the valve device 47 is reduced, and it is possible to prevent the size increase in the height direction of the oil filler cap 41.

Further, since the ratchet mechanism 55 that monitors the tightening torque is provided between the grip part 45 and the cap body 42, it becomes possible to keep the tightening margin of the screw part 43c of the oil filler cap 41 constant, and it is possible to facilitate attachment and detachment of the oil filler cap 41 and also realize secure closure of the oil filler opening 38a.

Further, since the ratchet mechanism 55 is arranged on the outer circumferential side of the ventilation passage part 46 that continues to the upper portion of the valve part 49B, it is possible to prevent the size increase in the height direction of the oil filler cap 41 while obtaining a merit according to the ratchet mechanism 55 being provided.

In the oil filler cap 41 in the present embodiment, the ventilation passage part 46 penetrates through the cap body 42 along the screw axis C1 and is supported relatively rotatably via the seal member 46c by the penetration part 44d of the cap body 42.

According to this configuration, since the ventilation passage part 46 that penetrates through the cap body 42 along the screw axis C1 is rotatably supported via the seal member 46c by the cap body 42, even in a configuration in which the piping is connected to the ventilation passage part 46, the ventilation passage part 46 is rotated when performing a tightening operation of the oil filler cap 41, and the piping is not rotated. Therefore, it is possible to improve workability.

In the motorcycle 1 in the present embodiment, the ventilation passage part 46 is connected via the charge piping 62 to the canister 63 that is supported on the vehicle body side.

According to this configuration, even in a configuration in which the ventilation passage part 46 is connected via the charge piping 62 to the canister 63 on the vehicle body side, since the ventilation passage part 46 is rotatable, distortion or the like of the charge piping 62 is prevented, and it is possible to favorably maintain the durability and the arrangement state of the charge piping 62 and to favorably perform the tightening operation of the oil filler cap 41.

In the motorcycle 1 in the present embodiment, the oil filler cap 41 is arranged at the upper part and the middle part in the right-to-left direction of the fuel tank 31.

According to this configuration, since the valve device 47 is positioned at the upper part of the fuel tank 31, it is possible to arrange the float 49 above the fuel fluid level and open the ventilation passage part 46 at an ordinary time when the inclination of the fuel fluid level is small and to allow the float 49 to react to the inclination of the fuel fluid level and close the ventilation passage part 46 with a good sensitivity at the time of vehicle body inclination and the like. Further, the valve device 47 is positioned at the middle part in the right-to-left direction of the fuel tank 31, and therefore, it is possible to allow the float 49 to react equally even at the time of vehicle body inclination to any of right and left directions.

In the motorcycle 1 in the present embodiment, the fuel tank 31 has the expansion shape part 32a of which the horizontal cross-sectional area is decreased toward the oil filler opening tube body 37 around the oil filler opening tube body 37.

According to this configuration, by narrowing the tank inner space directly below the oil filler opening tube body 37, the change of the fuel fluid level at the time of vehicle body inclination and the like is increased, and it is possible to enhance the reaction sensitivity of the float 49.

The present invention is not limited to the above embodiment described with reference to the drawings, and a variety of modification examples within the technical scope are conceivable.

For example, the above embodiment is described using an example of an application to the motorcycle in use for off-road traveling; however, the application of a vehicle is not limited thereto.

The saddle riding type vehicle includes all vehicles on which a driver straddles a vehicle body. The saddle riding type vehicle includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle.

The configuration in the above embodiment is an example of the invention, and various changes can be made without departing from the scope of the invention.

The invention claimed is:

1. An oil filler cap comprising:
   a cap body that is screwed to an oil filler opening part of a fuel tank and that closes an oil filler opening;
   a ventilation passage part that penetrates through the cap body and that allows an inside and an outside of the fuel tank to communicate with each other;
   a valve device that operates a float in accordance with a fuel fluid-level position and that opens and closes an opening which communicates with the ventilation passage part;
   a grip part that is provided to be relatively rotatable around a screw axis with respect to the cap body; and
   a ratchet mechanism that is formed between the grip part and the cap body and that monitors a tightening torque of the cap body,
   wherein a valve part of the valve device is arranged between a lower end of a screw part that is screwed to the oil filler opening part in the cap body and a seal surface that is arranged at a higher position than the screw part, the ventilation passage part is arranged above the valve part, and the ratchet mechanism is arranged on an outer circumferential side of the ventilation passage part,
   the ventilation passage part penetrates through a portion of the cap body including a center axis of the cap body and a portion of the grip part including a center axis of the grip part along the screw axis and is supported relatively rotatably via a seal member by a penetration part of the cap body penetrating the portion of the cap body including the center axis of the cap body,
   the seal member and the ratchet mechanism overlap in a direction of the screw axis, and
   the ratchet mechanism is arranged on an outer circumferential side of an outer circumferential end of the seal member.

2. A saddle riding type vehicle comprising:
   an oil filler cap according to claim 1,
   wherein the ventilation passage part is connected via a piping to an evaporated fuel reservoir that is supported on a vehicle body side.

3. The saddle riding type vehicle according to claim 2, wherein the oil filler cap is arranged at an upper part and a middle part in a right-to-left direction of the fuel tank.

4. The saddle riding type vehicle according to claim 2, wherein the fuel tank has an expansion shape part of which a horizontal cross-sectional area is decreased toward the oil filler opening part around the oil filler opening part.

5. The saddle riding type vehicle according to claim 3, wherein the fuel tank has an expansion shape part of which a horizontal cross-sectional area is decreased toward the oil filler opening part around the oil filler opening part.

* * * * *